US012621252B1

(12) United States Patent
Lakes et al.

(10) Patent No.: US 12,621,252 B1
(45) Date of Patent: May 5, 2026

(54) EXECUTING A SERVICE OF A FIRST ONLINE RESOURCE VIA A SECOND ONLINE RESOURCE

(71) Applicant: Amazon Technologies, Inc., Seattle, WA (US)

(72) Inventors: Nicholas Adam Lakes, Seattle, WA (US); Marc Benjamin Delgado Greenberg, Berkeley, CA (US); Alexander Nguyen, Newport Beach, CA (US); Heath Alex Van Singel, Seattle, WA (US); Madhur Mishra, Seattle, WA (US); Damian Sandhu-Franceschi, Seattle, WA (US); Dirk Huppert, Seattle, WA (US); Nicholas Davis, Edmonds, WA (US); Alan McCormick, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 18/538,274

(22) Filed: Dec. 13, 2023

(51) Int. Cl.
*G06F 15/173* (2006.01)
*H04L 47/70* (2022.01)
*H04L 47/80* (2022.01)

(52) U.S. Cl.
CPC .......... *H04L 47/808* (2013.01); *H04L 47/821* (2013.01)

(58) Field of Classification Search
CPC ........................... H04L 47/808; H04L 47/821

USPC .......................................................... 709/226
See application file for complete search history.

(56) References Cited

U.S. PATENT DOCUMENTS

| | | | |
|---|---|---|---|
| 2011/0289317 A1* | 11/2011 | Darapu ............ | H04N 21/43072 713/168 |
| 2012/0053965 A1* | 3/2012 | Hellman ................ | G06Q 40/08 726/4 |
| 2013/0103785 A1* | 4/2013 | Lyon ....................... | H04L 67/10 709/217 |
| 2013/0247142 A1* | 9/2013 | Nishizawa .......... | H04L 63/0815 726/1 |
| 2020/0145499 A1* | 5/2020 | Kaplan ............... | G06F 16/9538 |
| 2022/0286724 A1* | 9/2022 | Whittaker ........... | G06F 21/1083 |
| 2022/0414601 A1* | 12/2022 | Shek .................... | G06Q 10/103 |

* cited by examiner

*Primary Examiner* — Alan S Chou
(74) *Attorney, Agent, or Firm* — Kilpatrick Townsend & Stockton LLP

(57) ABSTRACT

Techniques for executing a service of a first online resource via a second online resource are described herein. For example, a computer system may receive, on a user interface at a user device to a second online resource, an item identifier, authentication data, and a first request for a first service of a first online resource. The computer system can determine an attribute of an item based on the item identifier indicating that the item is available via the second online resource and unavailable via the first online resource. The computer system can determine, based on the authentication data, that the first request is authenticated for a first user account with the first online resource. The computer system can cause execution of the first service to be initiated and send user information from the first user account to cause a presentation of the user information at the user interface.

20 Claims, 11 Drawing Sheets

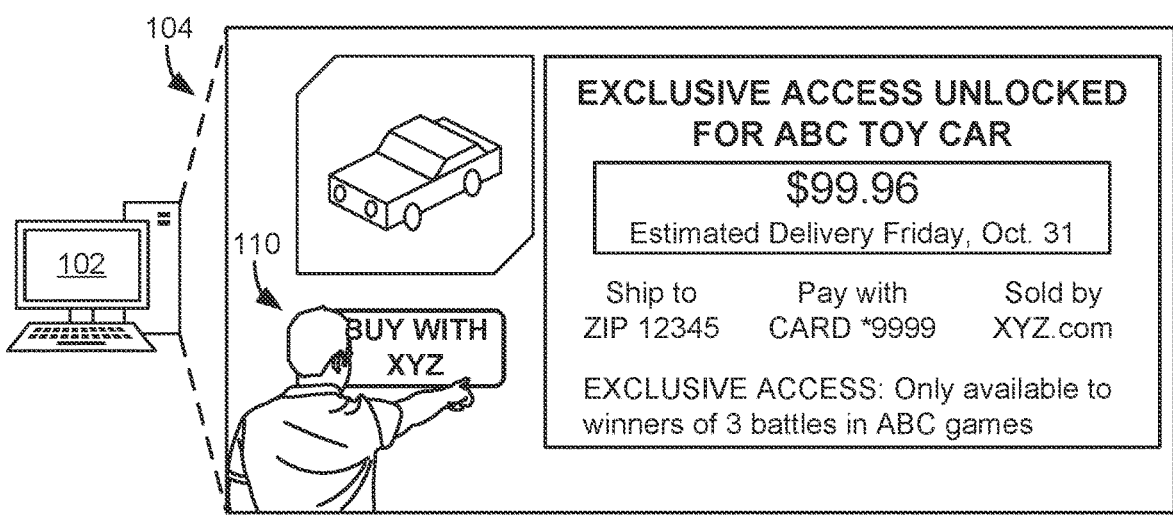
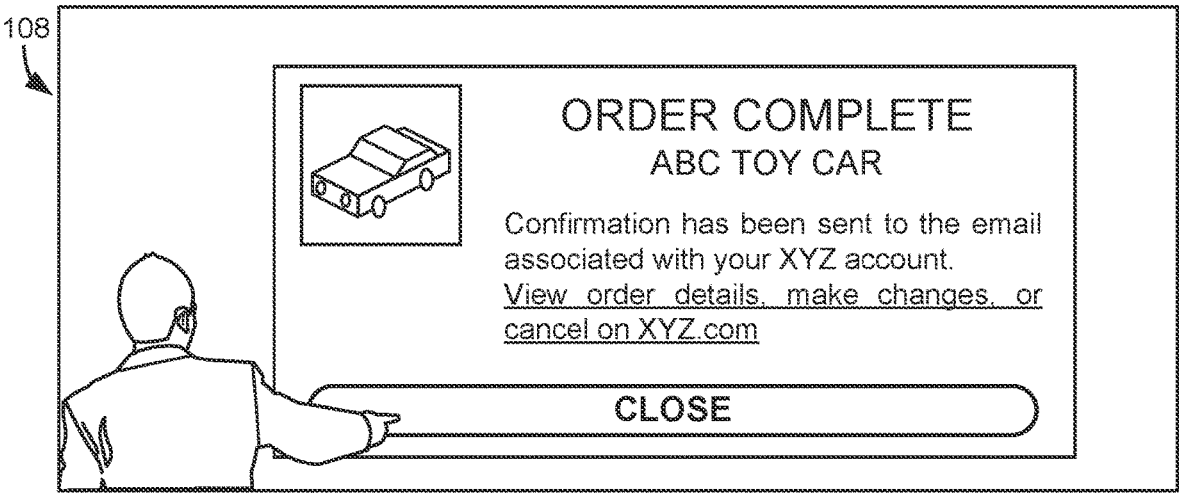
FIG. 1

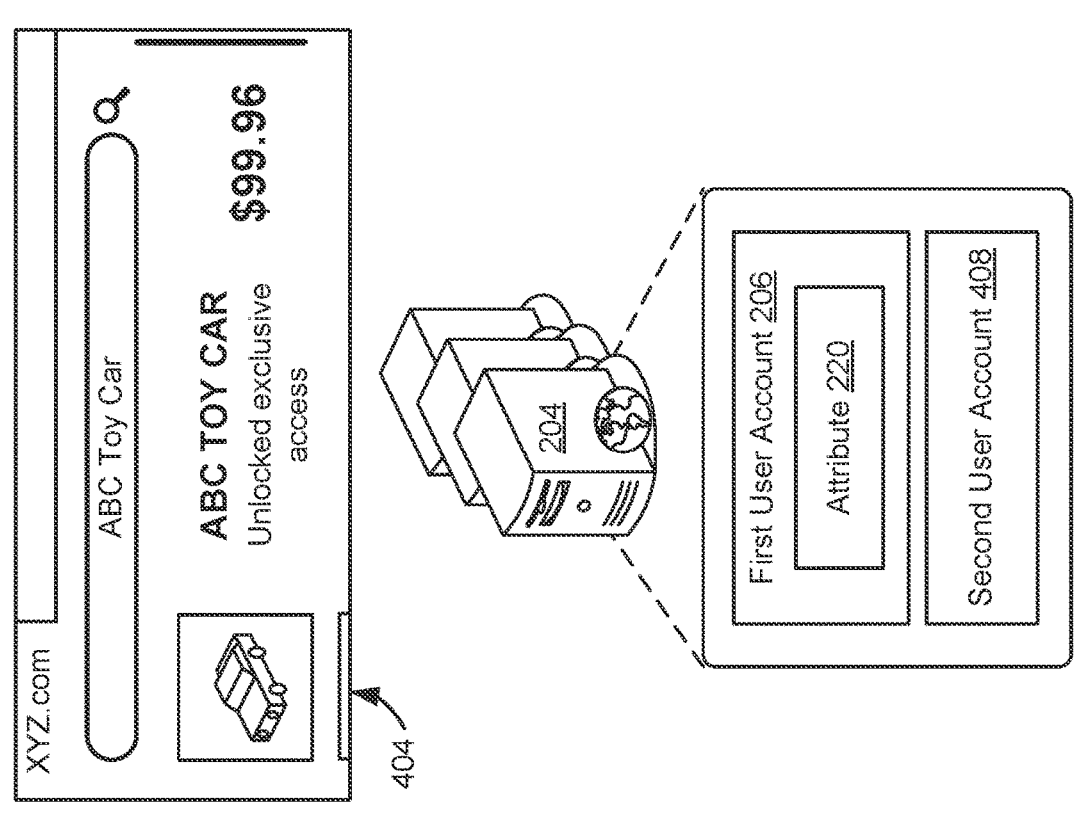
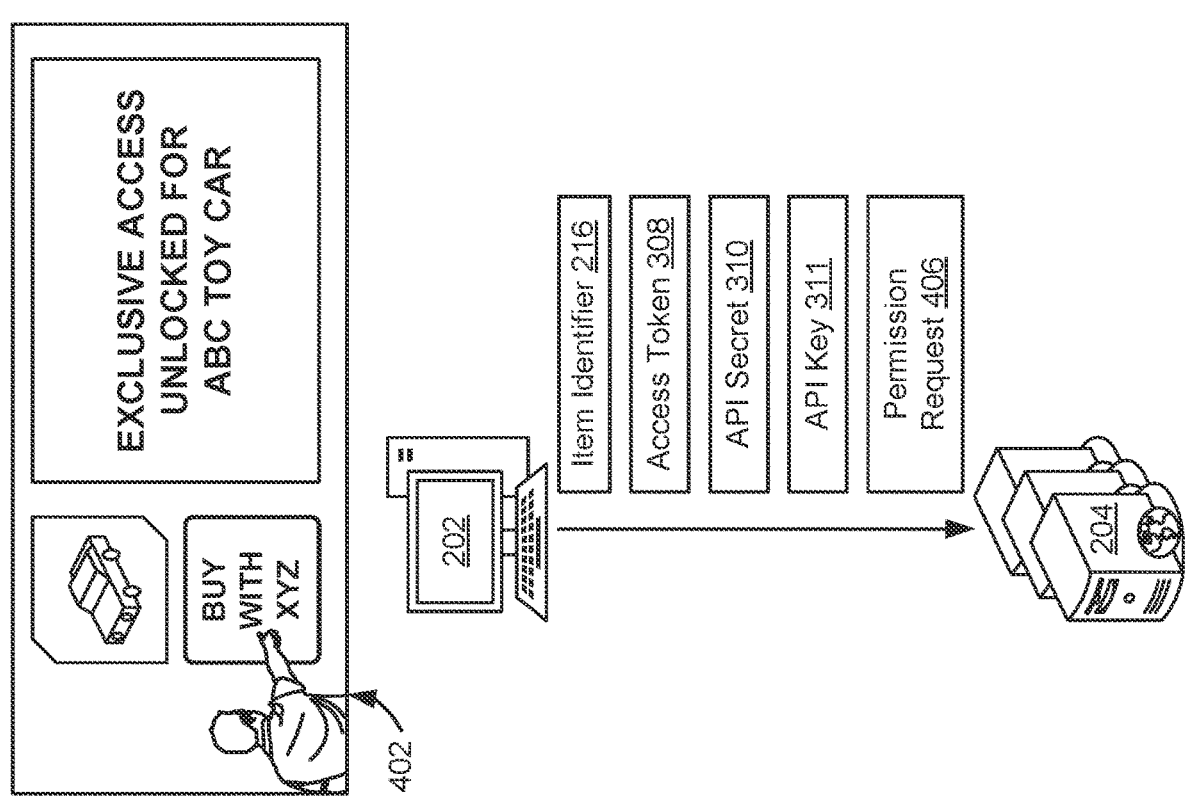
FIG. 4

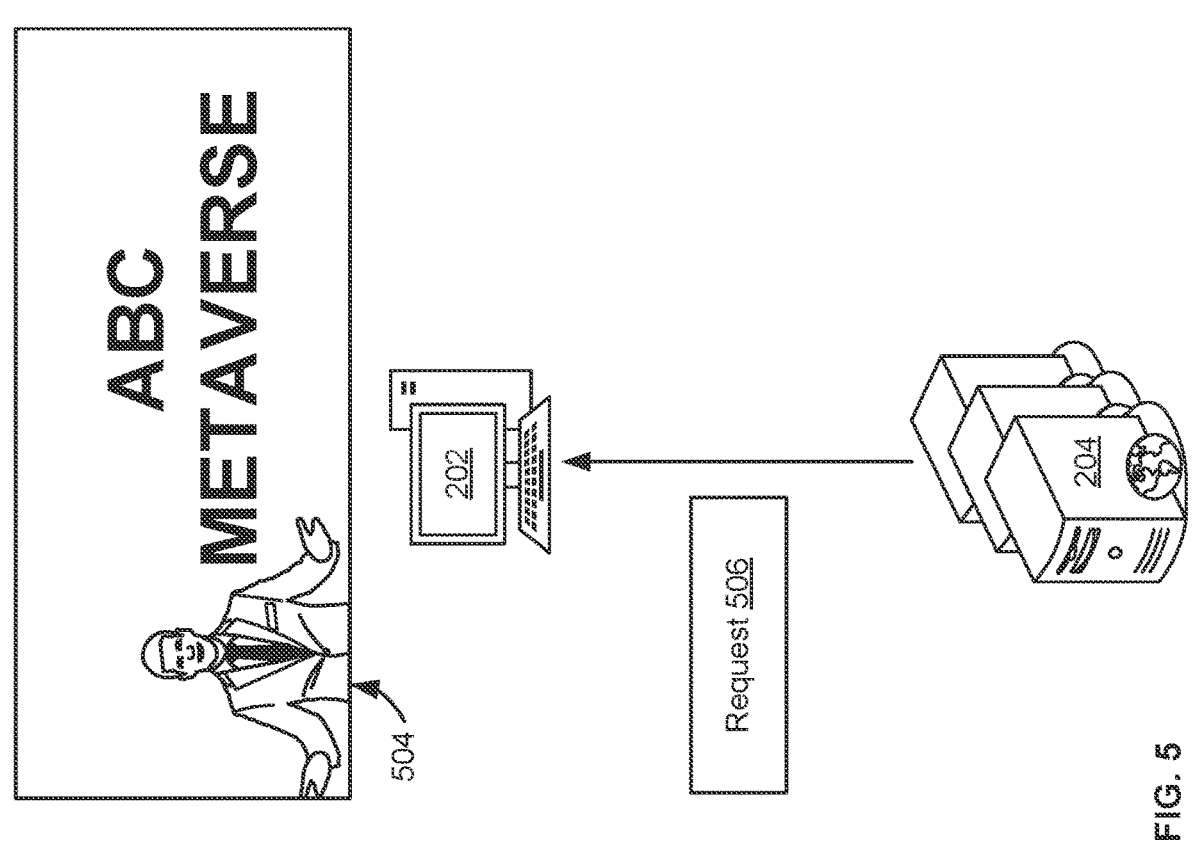
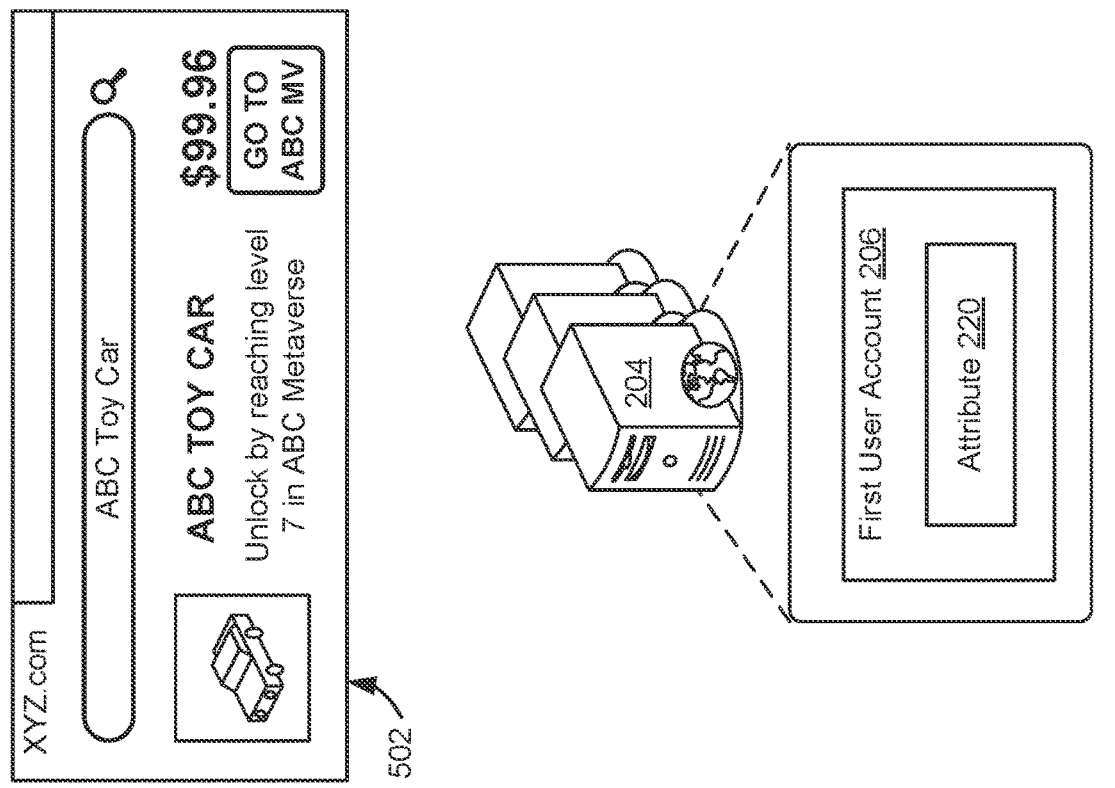
FIG. 5

700

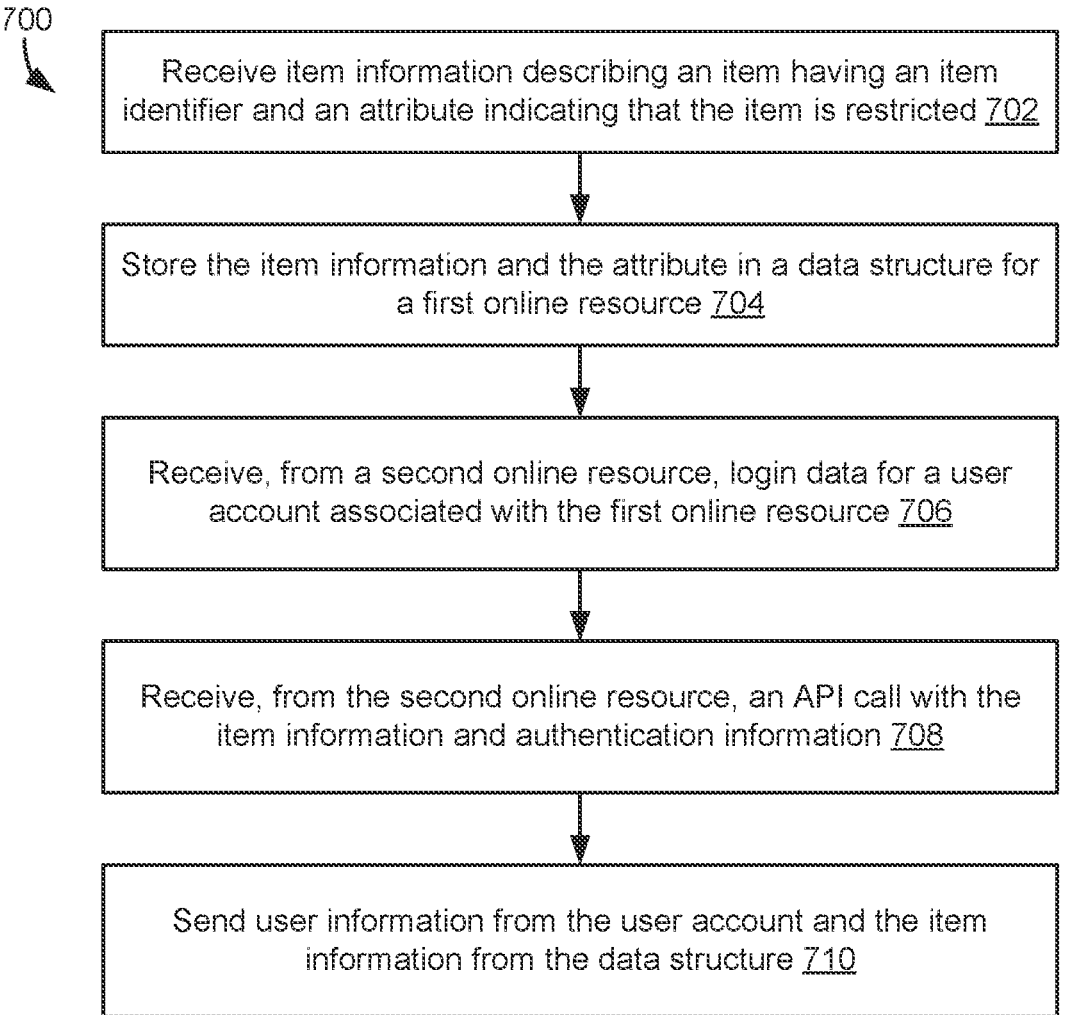

Receive item information describing an item having an item identifier and an attribute indicating that the item is restricted 702

Store the item information and the attribute in a data structure for a first online resource 704

Receive, from a second online resource, login data for a user account associated with the first online resource 706

Receive, from the second online resource, an API call with the item information and authentication information 708

Send user information from the user account and the item information from the data structure 710

Receive, based at least in part on a user interface at a user device to a second online resource, an item identifier associated with an item, authentication data, and a first request for a first service of a first online resource 802

Determine, based at least in part on the item identifier, an attribute of the item, the attribute indicating that the item is available via the second online resource and unavailable via the first online resource 804

Determine, based at least in part on the authentication data, that the first request is authenticated and a first user account with the first online resource, the first user account being inaccessible to the second online resource 806

Cause execution of the first service to be initiated 808

Send, based at least in part on the execution of the first service and in a first response to the request, user information from the first user account, the first response causing a presentation of the user information at the user interface 810

EXECUTING A SERVICE OF A FIRST ONLINE RESOURCE VIA A SECOND ONLINE RESOURCE

BACKGROUND

Typically, users have accounts across different electronic service providers, each providing a particular service. For example, a user may have a first account with a video game service and may use this account to play the video game. The user may also have a second account with an electronic store and may use this account to purchase items.

BRIEF DESCRIPTION OF THE DRAWINGS

Various embodiments in accordance with the present disclosure will be described with reference to the drawings, in which:

FIG. 1 illustrates example user interfaces for executing a service of a first online resource via a second online resource, according to an embodiment of the present disclosure;

FIG. 4 illustrates an example user interface and block diagram of a computing environment for restricting execution of a service of a first online resource via a second online resource, according to an embodiment of the present disclosure;

FIG. 5 illustrates an example user interface and block diagram of a computing environment for restricting execution of a service of a first online resource via a second online resource, according to an embodiment of the present disclosure;

FIG. 7 illustrates an example flow for executing a service of a first online resource via a second online resource, according to an embodiment of the present disclosure:

FIG. 8 illustrates an example flow for executing a service of a first online resource via a second online resource, according to an embodiment of the present disclosure;

DETAILED DESCRIPTION

Figure 2:
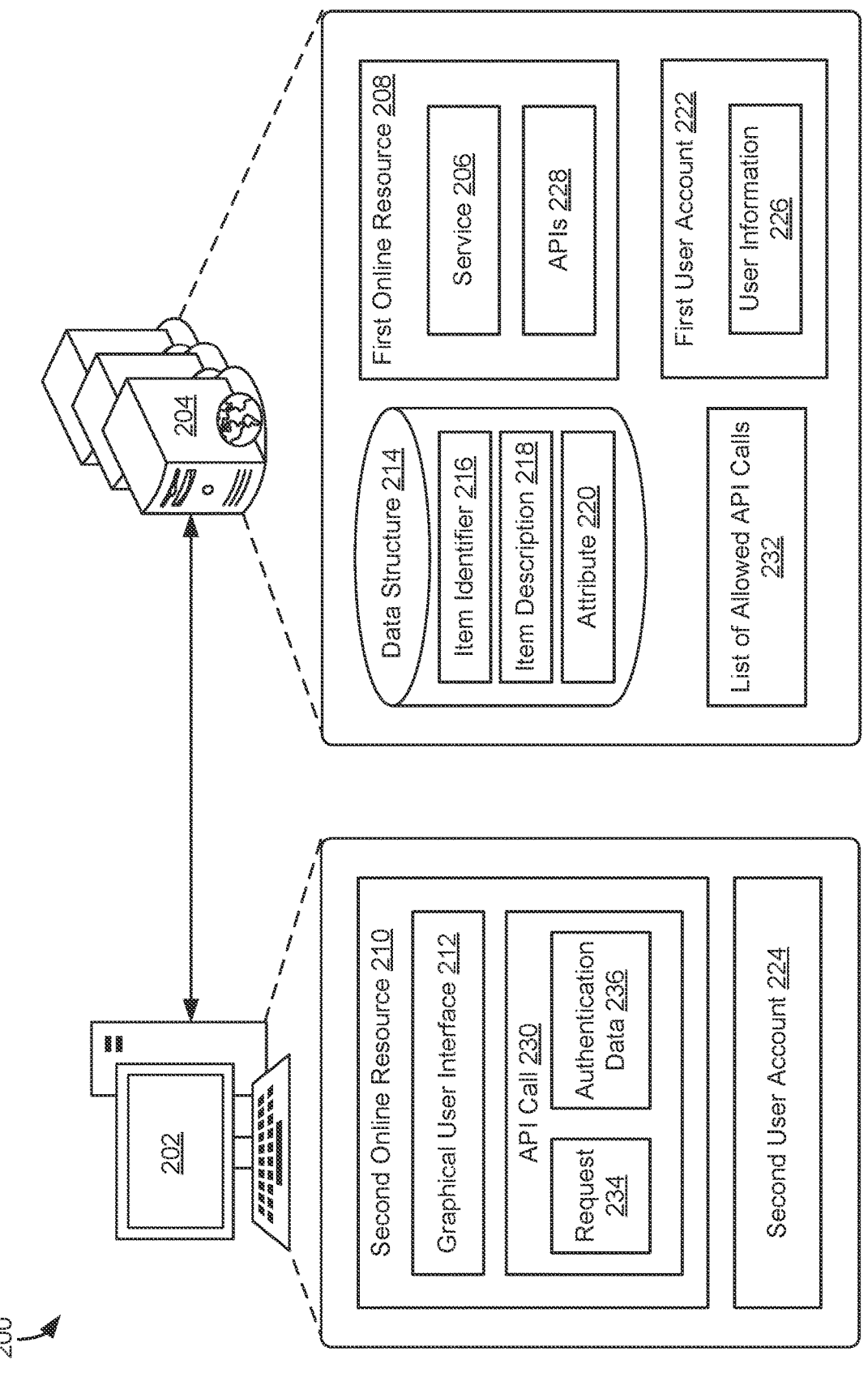
FIG. 2 illustrates an example block diagram of a computing environment for executing a service of a first online resource via a second online resource, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, executing a service of a first online resource via a second online resource, where the service is restricted or allowed based on requirements set by the second online resource. A user may interact with a user interface of the second online resource to access item information associated with an item, where the information is provided by the first online resource. The second online resource may issue application programing interface (API) calls to the first online resource to retrieve the item information. The item information may indicate that the item can be obtained via the second online resource rather than the first online resource. That is, the item may be unavailable to the user until the second online resource initiates a service for the item. If the first online resource authenticates a request from the second online resource to execute the service, the first online resource can initiate the execution of the service. The user interface for the second online resource can then be updated with information from the first online resource associated with the request. Thus, the second online resource can facilitate execution of a service for a particular item provided by a first online resource.

To illustrate, consider an example of a first online resource that may provide an electronic store with a catalog of products. A user may have a first user account with the electronic store that can be used to execute a service (e.g., a service configured to allow product purchases via the first online resource). A second online resource may provide a video game application. The user may also have a second user account that can be used to interact with the video game application. The video game application may also provide in-game opportunities to purchase products that are locked to purchase until the user has met an achievement (e.g., won a certain number of battles or reached a certain level in the video game). The products may be products that are sold by the electronic store, and may only be purchased (either via the video game application or via the electronic store) by a user that has met the achievement in the video game application. Upon meeting the achievement, the user can interact with the video game application to initiate purchase of the previously restricted product. The video game application can securely communicate with the electronic store to connect the user account for the video game application with the user account for the electronic store and execute the service (e.g., purchase the product for the user). Thus, the user may view and purchase exclusive products earned through in-game achievements via the video game application, without exiting the video game application to make the purchase via the electronic store. Additionally, in the electronic store, exclusive products may be locked for users that do not have a user account for the video game application and have met the achievement requirements for the product. This can maintain exclusivity and reward users of the video game application with unique or limited edition products.

In the interest of clarity of explanation, embodiments of the present disclosure are described with respect to a video game application that operates in connection with an electronic store that provides services related to restricted products that are locked to users of the video game application that have met achievements set by the video game application. Embodiments of the present disclosure may similarly and equivalently apply to any online resource (e.g., a web site, online market place, cloud service, etc.) that can provide a process that may include multiple services (e.g., a checkout process that includes receiving product information, previewing an order, or placing an order; a fraud detection process that includes receiving payment instrument information or verifying the payment instrument information; a shipping process; a printing process; or any other process).

Embodiments of the present disclosure provide several technological advantages over existing systems. Existing systems may not allow a first online resource to restrict a service for an item associated with a second online resource, such that the item is only available via the second online resource initiating the service. In contrast, embodiments herein may allow such a use of the second online resource to execute services of the first online resource. Furthermore, this use may provide a seamless and secure experience for a user that can be performed solely within the second online resource. A graphical user interface can be provided by the second online resource that can be updated based on information that is securely exchanged between the first online resource and the second online resource. Only a limited amount of user information from the user account associated with the first online resource may be exposed to the second online resource. Thus, the user may interact with the graphical user interface for the second online resource to initiate services such as purchasing restricted products via the first online resource with minimal security risk.

FIG. 1 illustrates example user interfaces for executing a service of a first online resource via a second online resource, according to an embodiment of the present disclosure. The first online resource may be an electronic store with a catalog of items that are available for purchase. The items may be physical items or virtual items. The second online resource may be a video game application executed by a server system (not shown). In other examples, the second online resource may be a mobile application, a virtual reality or augmented reality platform, a metaverse platform, or any other type of online resource with which a user can interact. As illustrated, a user device 102 may present a first graphical user interface (GUI) 104 of the second online resource (e.g., a metaverse video game application, referred to herein as "ABC Metaverse"), received from the server system executing the second online resource, to the user.

The user device 102 may be any type of computing device suitable for use to the user, capable of presenting a user interface, and capable of communicating with one or more computing resources of the electronic store including, for instance, web servers, to receive information and presentation instructions and to present such information based on the presentation instructions. A smart speaker, a smartphone, a mobile device, a tablet, a smart television, a gaming console, a laptop, a personal computer, and a desktop are examples of the user device 102.

The first GUI 104 may be an example of a user interface. Other user interface types are possible depending on the type of user device. For example, the user interface may be a voice-based interface presented by a smart speaker or a different computing device that provides an intelligent personal assistance service responsive to a wake word and/or a physical tap and capable different interactions including content playing, providing real-time information, and performing tasks and routines.

Generally, the first GUI 104 (or the user interface depending on its type) may be an interface to one or more of the computing resources of the second online resource, including to a web server. Content presented on the first GUI 104 and its presentation layout and functionalities, including information, input fields, selectable options, actionable options, and the like may be controlled by the computing resource(s) via presentation instructions.

The first GUI 104 may include an avatar 110 representing the user. The user can control the avatar 110 to interact with elements of the first GUI 104. For example, the user may interact with video game elements in the ABC Metaverse to perform objectives, such as winning a battle or completing a puzzle. In some examples, the user may achieve a certain objective set by the ABC Metaverse, such as winning three battles or achieving level seven of the video game. Achieving this objective may result in the ABC Metaverse making a restricted item available to the user (e.g., for purchase). Thus, the ABC Metaverse may display the first GUI 104 on the user device 102, which presents the ABC Toy Car for purchase from the first online resource (the first online resource is referred to herein as "XYZ" in the interest of illustrating the example item acquisition in FIG. 1). The user may have previously linked their user account for XYZ with their user account for ABC Metaverse. Linking the user accounts can allow ABC Metaverse and XYZ to securely communicate (e.g., with encrypted tokens).

The ABC Toy Car may be an item that is offered for by XYZ. But the ABC Toy Car may be locked for purchase for users that have not won three battles in ABC Metaverse. Prior to unlocking the ABC Toy Car, ABC Metaverse (e.g., the second online resource and/or the user device 102) may request product details for the ABC Toy Car from XYZ to display on the GUI but may not display an interface element that the avatar 110 can interact with to purchase the ABC Toy Car. After unlocking the ABC Toy Car, the first GUI 104 may be displayed on the user device 102. The first GUI 104 may include user information and item information received from XYZ. For example, the first GUI 104 may include product details for the ABC Toy Car, estimated delivery dates, and user information (which may, but need not be redacted) such as the last four digits of the user's credit card. The first GUI 104 may indicate that the ABC Toy Car is offered by XYZ, not by the ABC Metaverse. The first GUI 104 may also include an interface element such as a button that can be selected via the avatar 110 to initiate of the acquire the ABC Toy Car from XYZ.

When the user selects the button to acquire the ABC Toy Car, ABC Metaverse (e.g., the second online resource and/or the user device 102) can send a request to XYZ to initiate a preview order process. XYZ can then access information needed for the preview order process and send the information to ABC Metaverse, resulting in a second GUI 106 displayed on the user device 102. The second GUI 106 can display the additional information, such as a delivery date determined from user information (as opposed to the estimated delivery date displayed by the first GUI 104) and tax information determined from the user's location. The additional information may also include shipping information, discounts or coupons applied to the order, or a total price of the order. The second GUI 106 can also display a button interface element that the avatar 110 can select to place the order.

Once the user selects the button to place the order, ABC Metaverse (e.g., the second online resource and/or the user device 102) can send another request to XYZ to initiate execution of an order purchase service. XYZ can then perform the purchase of the ABC Toy Car for the user according to the user information stored in the user account for XYZ. After the order has been placed, XYZ can send information to ABC Metaverse confirming the purchase. A third GUI 108 can be displayed on the user device 102 to indicate to the user that the order has been completed. The third GUI 108 may include interface elements such as a link to XYZ that can be selected by the avatar 110. The link to XYZ may open an internal or external webpage or application at which the user can view the order details, make changes to the order, or cancel the order directly via XYZ.

FIG. 2 illustrates an example block diagram of a computing environment 200 for executing a service 206 of a first online resource 208 via a second online resource 210, according to an embodiment of the present disclosure. A device 202 can generate and/or present a graphical user interface 212 for the second online resource 210 that may provide a video game application (e.g., the ABC Metaverse described above in connection with FIG. 1). The device 202 may be an example of the user device 102 depicted in FIG. 1. The second online resource 210 can be a computer system remote from the device 202 and accessible to the device 202 over a network. Alternatively, the device 202 may be a computing device that includes the second online resource 210. A computer system 204 can provide (e.g., host and/or include) the first online resource 208, which may be an online marketplace (e.g., XYZ described above in connection with FIG. 1). The first online resource 208 may execute services 206, such as checkout processes, payment processes, preview order processes, or any other processes associated with an online marketplace.

The computer system 204 may include a data structure 214 that can store item information for items. For example, the data structure 214 may be a catalog of items offered from the electronic store that can be browsed or searched by a user, such as on a web page presented by the computer system 204. Each item catalogued by the data structure 214 can have an item identifier 216 and an item description 218. The item identifier 216 can uniquely identify an item, and the item description 218 can include any information related to the item that is to be presented to a user. This can include descriptions (including texts, images, or other multimedia formats) of the item, price, availability, delivery dates, and the like.

Some items provided by the first online resource 208 may be restricted based on restrictions set by the second online resource 210. For example, an item may be locked for purchase unless a user has achieved an objective in the second online resource 210. To lock the item, the first online resource 208 can store an attribute 220 in association with the item identifier 216. The attribute 220 can indicate that the item is restricted. Thus, the item may be searchable in the catalog for the first online resource 208 but may not be purchased by a user until the attribute 220 is modified in response to the second online resource 210 has confirmed that the item is no longer restricted for the user.

The user may have a first user account 222 associated with the first online resource 208 and a second user account 224 associated with the second online resource 210. The first user account 222 may store user information 226 for the user, such as payment information, shipping address, user subscriptions, or the like. The computer system 204 may access the user information 226 to perform services 206 (e.g., checkout processes for purchasing items) for the first online resource 208.

The user may be logged into the second user account 224 to interact with the GUI 212 for the second online resource 210. The first user account 222 may not be authorized to initiate services for the second online resource 210, and similarly the second user account 224 may not be authorized to initiate services for the first online resource 208. But the user may interact with the GUI 212 for the second online resource 210 to log into the first user account 222 for the first online resource 208. This can allow the second online resource 210 to access application programming interfaces (APIs) 228 for the first online resource 208. For example, after the user achieves the objective set by the second online resource 210 that is required to unlock the item, the device 202 can send API calls 230 to the computer system 204 requesting that a service 206 for the item be initiated. The computer system 204 can store a list of allowed API calls 232 that associates API keys with item identifiers. An API key can be a key that the first online resource issues to a third party (e.g., the second online resource) to identify the third party. If the API call 230 from the device 202 includes an API key that is associated with the item identifier 216 on the list of allowed API calls 232, the first online resource 208 may initiate execution of the service 206. If the API key in the API call 230 is not associated with the item identifier 216, according to the list of allowed API calls 232, the first online resource 208 may not initiate execution of the service 206.

The API call 230 may include a request 234 for a particular service and authentication data 236. For example, the request 234 may be a request to place an order for the item. The authentication data 236 may include authentication tokens that can validate that the API call 230 is being placed by the second online resource 210. The request 234 may also include information indicating that the user has achieved the objective that is locking the item, and that the item is to be no longer restricted for the user. The computer system 204 can validate the authentication data 236 and initiate execution of the service 206 to place the order.

In some examples, the item may have variations that can be selected by the user. In the example depicted in FIG. 1, the ABC Toy Car may be available in multiple colors. In another example, the item may be a shirt that is available in multiple colors and sizes. When the device 202 sends a first API call to the computer system 204 requesting user information 226 and item information for an item that has variations, the computer system 204 can include first item information about a first variation of the item and second item information about a second variation of the item (e.g., a blue ABC Toy Car and a red ABC Toy Car). This can cause the device 202 to present the item information of the variations in the GUI 212, such as part of an interface element that the user can interact with to select one of the variations. When the user selects a variation (e.g., a blue ABC Toy Car), the device 202 can send the selection to the computer system 204. The selection can be used by the computer system 204 in association with executing a service 206. For example, if the user initiates execution of a purchase service via the second online resource 210, the first online resource 208 can place an order for the blue ABC Toy Car for the user.

Additionally or alternatively, the computer system 204 can pre-select a default variation of the item to send to the device 202 in response to receiving the first API call. The computer system 204 can access the user information 226 in the first user account 222 to determine which variation is to be selected as default. For example, if the item is a shirt and the user information 226 indicates that the user has previously purchased a medium size of shirt, the computer system 204 can determine that a medium size is the default variation for the item. The computer system 204 can transmit a response to the first API call that includes item information for all variations (e.g., a medium size and a large size) to the device 202 but can include an indication that the first variation of a medium size of shirt is selected as the default variation. The device 202 can therefore present the medium size of shirt as a pre-selected option on the GUI 212, although other sizes of shirt may also be selected by the user.

Figure 3:
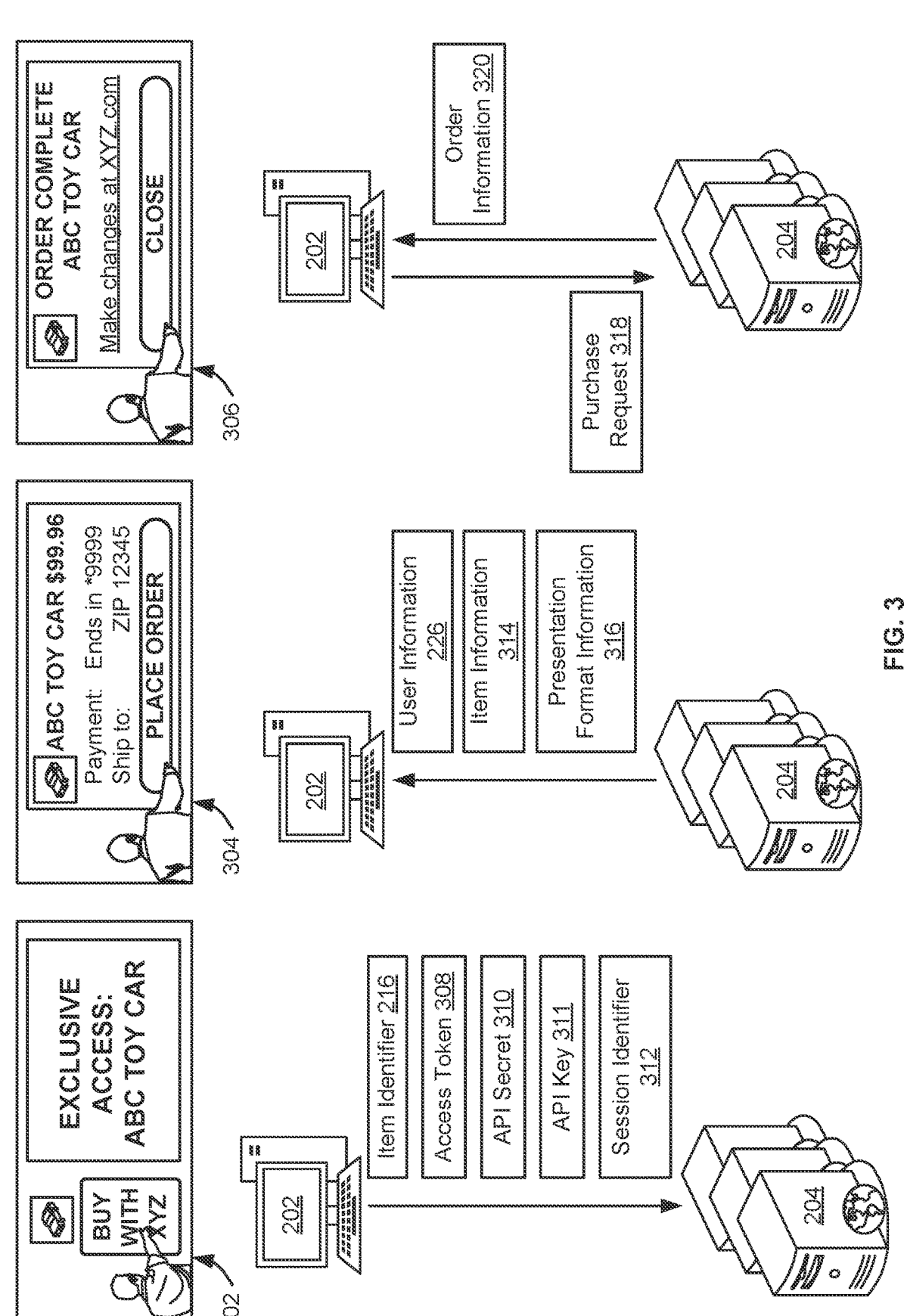
FIG. 3 illustrates an example user interface and block diagram of a computing environment for executing a service of a first online resource via a second online resource, according to an embodiment of the present disclosure.

FIG. 3 illustrates example user interfaces and a block diagram of a computing environment for executing a service of a first online resource via a second online resource, according to an embodiment of the present disclosure. The computing environment of FIG. 3 may include the device 202 associated with a second online resource and the computer system 204 providing a first online resource of FIG. 2. The device 202 may generate and/or present a graphical user interface (GUI) of the second online resource to a user. The user may interact with the second online resource, such as the ABC Metaverse described above in connection with FIG. 1, using the GUI. For example, the user may play games or interact with elements of the ABC Metaverse. The ABC Metaverse may initiate execution of services for locked items provided by the first online resource, such the XYZ online marketplace described above in connection with FIG. 1.

In some examples, the user may unlock an achievement set by the ABC metaverse, such as winning three battles within the ABC metaverse. Unlocking the achievement may allow the user to access an item provided by the first online resource. The item may have previously been locked to the user before the user unlocked the achievement. Once the achievement is met and the item is unlocked, the device 202 can generate and/or present a first GUI 302 that indicates that the item has been unlocked and that the item can be bought with the first online resource (e.g., the XYZ online platform). The user can interact with the first GUI 302 to select the option to buy the item with XYZ.

In response to the user selecting the option to buy the item with XYZ, and to provide the user access to the unlocked item, the device 202 may send an API call to the computer system 204 with a request for a first service in a checkout process for purchasing the item. The request may include an item identifier 216 for the item and authentication data such as an access token 308, and an API key 311. In some examples the request may also include an API secret 310 and a session identifier 312. One example of the access token 308 can be an OAuth token. The access token 308 can be a token that indicates that the second online resource has permission to access certain functions (e.g., accessing user information) for the first online resource, on behalf of the first user account for the first online resource. Each time the second online resource requests access to information from the first online resource, the request may include the access token 308. The API key 311 may be an identification key for the second online resource. The API secret 310 may be a hash key that is encrypted to validate that the request is originating from the second online resource. The session identifier 312 may be a unique identifier for the current session for the user interacting with the second online resource. The request may additionally include a request for item information and user information to be displayed in a "preview order" process for the second online resource.

After receiving the request, the computer system 204 can validate the authentication data received from the device 202. For example, the computer system 204 can validate that the access token 308 is associated with the first user account for the first online resource and with the second user account for the second online resource. The computer system 204 can validate that API key 311 by accessing a list of allowed API calls to determine if the API key 311 is associated with the item identifier 216 on the list. In some examples, the computer system 204 can also validate that the API secret

310 is associated with the second online resource, such as by decrypting the cryptographic hash key. The API secret 310 can be a "password" that is used in connection with the API key 311 to request access to information from the computer system 204. In other examples, the API secret 310 may not be used in authenticating the request.

Validating the authentication data can unlock (e.g., allow access to) the item associated with the item identifier 216 for the user. In some examples, the computer system 204 can store an allowed list of items for the user (e.g., in the first user account 206 for the user). The item identifier 216 can be added to the allowed list of items. Additionally or alternatively, the computer system 204 can store an allowed list of user identifications for a particular item identifier 216, and a user identification for the user can be added to the allowed list of user identifications. In either case, when the second online resource accesses a product page for the item, the allowed list of items or the allowed list of user identifications can be checked and the item can be determined to be unrestricted for the user.

After validating the authentication data, the computer system 204 can generate a response to the request. For example, the response can include a portion of the user information 226, additional item information 314 for the item, and presentation format information 316 that can be used to control a presentation of the information on the GUI for the second online resource. The portion of the user information 226 may include user information. For example, to keep user information 226 such as location or credit card information secure, the user information 226 transmitted to the device 202 may only include the last four digits of a credit card number, and only the zip code of a shipping address. The additional item information 314 may include the current price of the item, or any other item information that may have been updated since the last time the second online resource accessed the item information. The device 202 can receive the response and can generate a second GUI 304 displaying the user information 226 and the item information 314 as part of a "preview order" display, according to the presentation format information 316. The user can interact with the second GUI 304 to select an interface element, such as a button labeled "place order."

In some examples, the second GUI 304 may also include a user interface element that allows the user to make a change to a portion of the displayed user information 226. For example, the second GUI 304 may include a text box in which the user can enter an alternate address to which the item can be shipped, or an alternate payment method that can be used to purchase the item. Upon receiving the change to the portion of the user information 226, the device 202 can transmit the change to the computer system 204. The computer system 204 can then store the change in association with the first user account and the item identifier 216.

Alternatively, the user interface element may be a link to the first online resource that can be selected by the user. If the user interacts with the second GUI 304 to select the link, the device 202 can transmit an indication of this interaction to the computer system 204. The computer system 204 can then cause the device 202 to present a user interface (not pictured) to the first online resource (e.g., XYZ online marketplace) with which the user can interact to input a change to the user information 226. The computer system 204 can then store the change in association with the first user account and the item identifier 216.

A user selecting the "place order" button on the second GUI 304 can cause the device 202 to transmit another request to the computer system 204. The request may include a purchase request 318 to initiate execution of a service that purchases the item for the user. In some examples, the request may additionally include the session identifier 312. The session identifier 312 can help ensure that the computer system 204 returns consistent information (e.g., user information 226 or item information 214) to the device 202. In some examples, if the session identifier 312 received in this request is the same as the original session identifier, the computer system 204 may skip looking up the attribute. The computer system 204 may also skip re-authenticating the request. In other examples, the computer system 204 may not skip looking up the attribute or re-authenticating the request if the session identifier 312 is received in the request. The computer system 204 can then execute the service to purchase the item, which may involve accessing user information 226 such as credit card information, a shipping address for the user, an email address for the user, and the like. After the service is executed and the purchase is confirmed, the computer system 204 may send a response including order information 320 to the device 202. The order information 320 may include confirmation of the order, as well as presentation format information 316 for displaying the confirmation of the order. The device 202 can use the order information 320 to generate and/or present a third GUI 306 displaying the order information 320 according to the presentation format information 316 to the user. This can indicate to the user that any adjustments to the purchase of the item can be performed via the first online resource.

In some examples, receiving the indication that the order is complete can cause the device 202 to cause an update of a service of the second online resource to be presented. For example, purchasing an item may unlock a new level of the ABC Metaverse. In another example, the item may be a skin that can be applied in the ABC Metaverse, and purchasing the item may cause the device 202 to automatically apply the skin to the user's avatar in the GUI.

FIG. 4 illustrates example user interfaces and a block diagram of a computing environment for restricting execution of a service of a first online resource via a second online resource, according to an embodiment of the present disclosure. The computing environment of FIG. 4 may include the device 202 associated with a second online resource and the computer system 204 providing a first online resource of FIG. 2. The device 202 may generate and/or present a graphical user interface (GUI) of the second online resource to a user. The user may interact with the second online resource, such as the ABC Metaverse described above in connection with FIG. 1, using the GUI. For example, the user may play games or interact with elements of the ABC Metaverse. The ABC Metaverse may initiate execution of services for locked items provided by the first online service, such the XYZ online marketplace described above in connection with FIG. 1.

Similar to the example illustrated in FIG. 3, the device may generate and/or present a first GUI 402 that gives a user access to a previously restricted item via XYZ, after the user has met an achievement set by the ABC Metaverse. When the user interacts with the first GUI 402 to select a button labeled "buy with XYZ" to initiate a purchase process for the item, the device 202 may transmit a request to the computer system 204. The request may include the item identifier 216 for the item, the access token 308 indicating that the second user account for the second online resource has a privilege level allowing access to services and/or information from the second online resource, and an API key 311 validating that the request originated from the second online resource. Optionally, the request may include an API secret 310. The request may also include a permission request 406 that indicates that the attribute 220 for the item should be updated for the user. For example, the request 406 may be a request to adjust the attribute 220 to no longer apply the restriction of the item to the first user account 222. In response, the computer system 204 can associate the indication that the attribute 220 is no longer applicable to the first user account 222. This indication can allow a user to purchase the item via the first online resource or the second online resource.

For example, the user may interact with the first GUI 402 generated and/or presented by the device 202 to complete the purchase of the item. Alternatively, the user may interact with a second GUI 404 generated by the computer system 204 and presented via a user device (e.g., the user device 102 of FIG. 1) to complete the purchase of the item. For example, the second GUI 404 may correspond to a web page for the XYZ online marketplace (or may correspond to a smartphone application of the XYZ online marketplace). The user can interact with the web page (or smartphone application) to search a catalog of items for the ABC Toy Car. Because the first user account 222 for XYZ includes the indication that the user can access the item, the user may purchase the item from the XYZ web page (or application of a smartphone, gaming console, smart television, or any other type of device).

In some examples, after the computer system 204 stores the indication that the item is available from XYZ to the first user account 222, the exclusive offer to purchase the item may be gifted by the user to another user. For example, the computer system 204 may transmit a response to the permission request 406 to the device 202 that can cause the device 202 to present a user interface element (e.g., a button labeled "gift ABC Toy Car to a friend") on the GUI for ABC Metaverse. If the user selects the user interface element, the device 202 may transmit an API call requesting that the computer system 204 make the item available from XYZ to a second user account 408 with XYZ. The response may include an account username for the second user account 408. In response to the API call, the computer system 204 can store an indication that the item is available from XYZ to the second user account 408. Thus, a second user associated with the second user account 408 may be allowed to purchase the ABC Toy Car from XYZ, even though the second user may not have unlocked exclusive access to the ABC Toy Car via the ABC Metaverse.

FIG. 5 illustrates example user interfaces and a block diagram of a computing environment for restricting execution of a service of a first online resource via a second online resource, according to an embodiment of the present disclosure. The computing environment of FIG. 5 may include the device 202 associated with a second online resource and the computer system 204 providing a first online resource of FIG. 2. The device 202 may generate and/or present a graphical user interface (GUI) of the second online resource to a user. The user may interact with the second online resource, such as the ABC Metaverse described above in connection with FIG. 1, using the GUI. For example, the user may play games or interact with elements of the ABC Metaverse. The ABC Metaverse may initiate execution of services for locked items provided by the first online service, such the XYZ online marketplace described above in connection with FIG. 1.

Similar to the example illustrated in FIG. 4, the computer system 204 may generate a first GUI 502 and presented to a user device (e.g., the user device 102 of FIG. 1). The first GUI 502 may correspond to a web page for the XYZ online marketplace (or may correspond to a smartphone application of the XYZ online marketplace). The user can interact with the web page (or smartphone application) to search a catalog of items for the ABC Toy Car. But the user may not have met the achievement required by the second online resource, such as reaching level seven in the ABC Metaverse. The computer system 204 may determine that the ABC Toy Car is unavailable by accessing the attribute 220 for the item. The attribute 220 may indicate that the item is restricted for the first user account 222 of the first online resource. Thus, the user may be restricted from purchasing the ABC Toy Car via the first GUI 502. The first GUI 502 may present an indication that the ABC Toy Car is unavailable via XYZ and may present instructions for unlocking the ABC Toy Car (e.g., reaching level seven in the ABC Metaverse). Similarly, if the user interacts with a GUI for the ABC Metaverse and attempts to purchase the ABC Toy Car before reaching level seven, the ABC Metaverse may present a GUI indicating that the ABC Toy Car is unavailable until the achievement is met.

If the attribute 220 indicates that the item is restricted for the first user account 222, the first GUI 502 may not include an interface element that a user can interact with to purchase the item, such as a button labeled "buy now" or "add to cart." Instead, the first GUI 502 may include an interface element that can redirect the user to the second online resource, such as a button labeled "Go to ABC Metaverse" and linked (e.g., associated with a uniform resource locator (URL)) to ABC Metaverse. Upon selection by the user, the computer system 204 can send a request 506 to the device 202 to present a second GUI 504 to the second online resource. For example, the request 506 may cause the device 202 to display the second GUI 504 for the opening page of the ABC Metaverse. The user can then interact with the second GUI 504 to meet the achievement and unlock the item.

Figure 6:
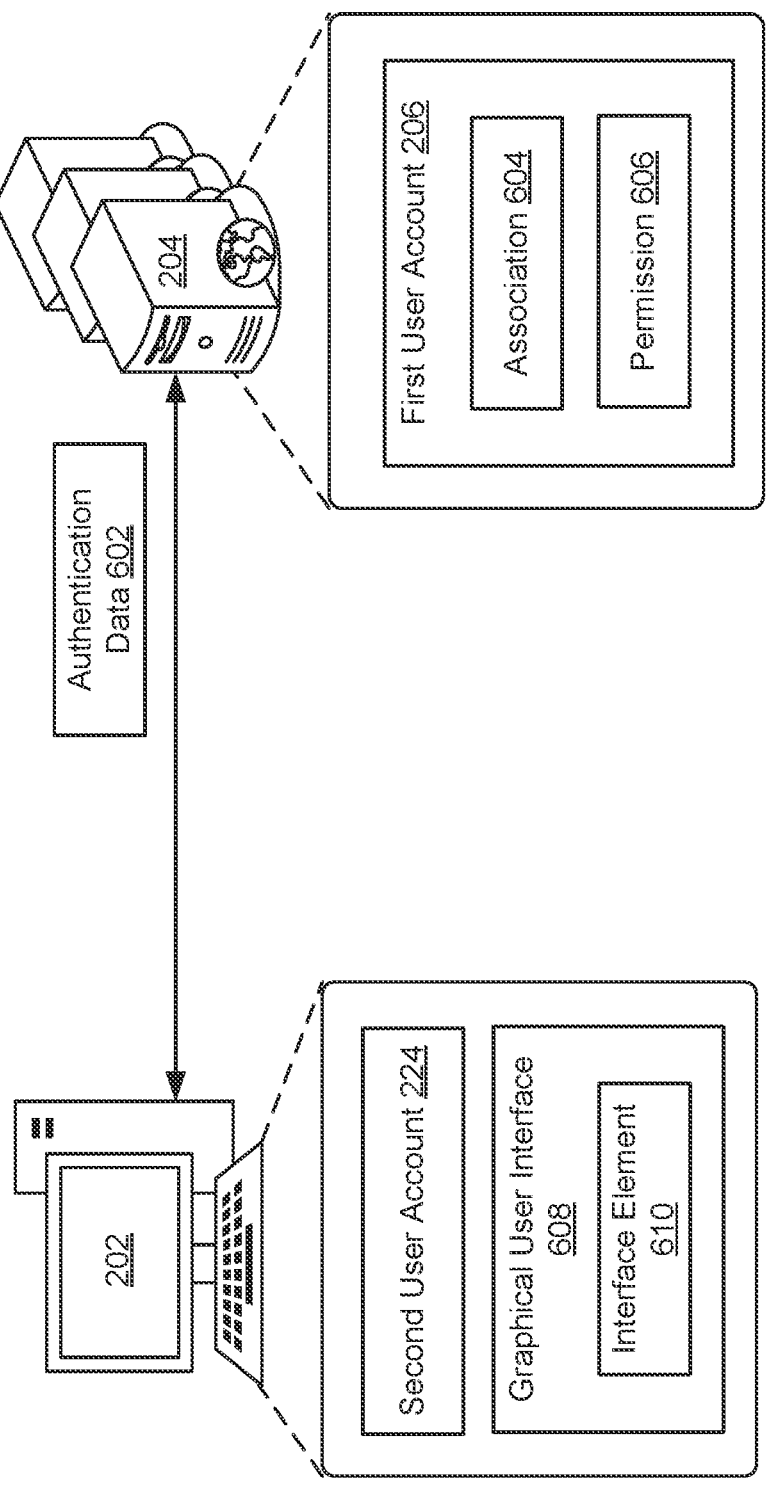
FIG. 6 illustrates an example block diagram of a computing environment for enabling execution of a service of a first online resource via a second online resource, according to an embodiment of the present disclosure.

FIG. 6 illustrates an example block diagram of a computing environment for enabling execution of a service of a first online resource via a second online resource, according to an embodiment of the present disclosure. The computing environment of FIG. 6 may include the device 202 associated with a second online resource and the computer system 204 providing a first online resource of FIG. 2. The device 202 may generate and/or present a graphical user interface (GUI) of the second online resource to a user. The user may interact with the second online resource, such as the ABC Metaverse described above in connection with FIG. 1, using the GUI. For example, the user may play games or interact with elements of the ABC Metaverse. The ABC Metaverse may initiate execution of services for locked items provided by the first online service, such the XYZ online marketplace described above in connection with FIG. 1.

The user may interact with the first online resource using a first user account 222 (e.g., to browse and shop at the XYZ online marketplace). The user may interact with the second online resource using a second user account 224 (e.g., to participate in the ABC Metaverse). Before the user accesses items provided by XYZ that are locked to users that achieve certain objectives in the ABC Marketplace, the user may opt-in to associating the first user account 222 to the second user account 224 to enable access to exclusive offers, such as restricted items.

For example, the user may interact with the second online resource to initiate associating the first user account 222 and the second user account 224. The second online resource may present an interface element that the user can select. The interface element may be a link to a service (e.g., a secure login service) of the first online resource, at which the user can input authentication data 602 that is transmitted to the computer system 204. The authentication data 602 may include login information (e.g., a user account name and password) for the first user account 222. If the computer system 204 determines that the authentication data 602 matches stored authentication data for the first user account 222, the computer system 204 may store an association 604 between the first user account 222 and the second user account 224. Once the association 604 has been established, the computer system 204 can transmit an access token to the device 202. The device 202 may store the access token in association with the second user account 222 for the second online resource (e.g., as part of a profile for the user). The computer system 204 may also store a permission 606 associated with the first user account 222 to present a user interface element 610, such as a button enabling purchase of the item once the achievement set by the second online resource has been met. The user interface element 610 can thereafter be presented on a GUI for the first online resource or the second online resource. Subsequent requests for purchasing the item can therefore be initiated by the user interacting with the user interface element 610. Although the association is described as being initiated via the second online resource, an equivalent process can be initiated via the first online resource.

FIGS. 7, 8, 9, and 10 illustrate example flow charts for executing a service of a first online resource via a second online resource, according to embodiments of the present disclosure. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the user device 102, the device 202, the computer system 204, a user device 1102, a web server 1106, and/or an application server 1108 may perform the flows 700, 800, 900, and 1000 of FIGS. 7, 8, 9, and 10.

In FIG. 7, the flow 700 may include operation 702, where a computer system may receive item information describing an item having an item identifier and an attribute indicating that the item is restricted. The item may be usable by a first service of a first online resource. For example, the item may be a physical or virtual product. The first online service may be an electronic store that offers items for sale, and the first service can be a service used in a checkout process for purchasing items. The attribute may indicate that the item is restricted to one or more resources other than the first online resource. That is, although the electronic store may list the item, purchase of the item may not be performed via the electronic store. The item may be associated with a second online resource, such as a video game program or application. The second online resource may set the conditions associated with the attribute. For example, the second online resource may restrict purchase of the item to users that have reached a video game achievement for the second online resource.

In an example, the flow 700 may include operation 704, where the computer system may store the item information and the attribute in a data structure for a first online resource. The data structure may be an item catalog listing items that are sold by the first online resource. Storing the item information in the data structure may allow the item to be searchable in the electronic store (e.g., the first online resource), but the attribute may prevent the item from being purchased. For example, a product detail web page for the item may not include a user interface element that can be selected to purchase the product, such as an "add to cart" button.

In an example, the flow 700 may include operation 706, where the computer system may receive, from the second online resource, login data for a user account associated with the first online resource. The second online resource may send the login data to link the user account for the first online resource to a user account for the second online resource. The login data may be provided by a user that is opting in to accessing restricted items of the first online resource via the second online resource. The first online resource may compare the login data received from the second online resource to login data stored for the user account for the first online resource. If the login data matches, the first online resource may store an association between the user account for the first online resource and the user account for the second online resource. In some examples, the association may include an access token for the second online resource that indicates that the second online resource has permissions to request information from the first online resource.

In an example, the flow 700 may include operation 708, where the computer system may receive, from the second online resource, an API call with the item information and authentication information. The computer system may compare the authentication information received from the second online resource to stored authentication information for the user account for the first online resource. For example, the authentication information may include the access token that indicates that the second online resource has permission to access the item information. The API call may also include a request for a service, such as a request for a "preview order" service from the first online resource. The first online resource may use the item information, which may include an item identifier, to identify that the item is available via the second online resource upon authentication of the request. Because the request was authenticated for the user account, the first online resource may execute the service.

In an example, the flow 700 may include operation 710, where the computer system may send user information from the user account and the item information from the data structure, based at least in part on the execution of the service. The user information may include information used in previewing an order for purchase, such as payment information or redacted location information for the user. The item information may include any additional information for the item, such as price of the item accessed from the data structure. Sending the user information and the item information may cause a user device to present the user information and the item information in a graphical user interface for the user.

FIG. 8 illustrates an example flow 800 for executing a service of a first online resource via a second online resource, according to an embodiment of the present disclosure. The flow 800 may start at operation 802, which may include a computer system for a first online resource receiving, based at least in part on a user interface at a user device to a second online resource, an item identifier associated with an item, authentication data, and a first request for a first service of a first online resource. The authentication data may include an access token and, in some examples, a secret.

In an example, the flow 800 may include operation 804, where the computer system may determine, based at least in part on the item identifier, an attribute of the item, the attribute indicating that the item is available via the second online resource and unavailable via the first online resource. The attribute may indicate that the item is restricted to one or more resources other than the first online resource. The attribute may be determined from a data structure storing item information for the item based at least in part on the item identifier from the API call.

In an example, the flow 800 may include operation 806, where the computer system may determine, based at least in part on the authentication data, that the first request is authenticated and a first user account with the first online resource. The first user account may be inaccessible to the second online resource. The computer system may authenticate the first request at least by determining that the access token is associated with the first user account and a second user account with the second online resource. In some examples, the computer system may validate that the secret is associated with the second online resource.

In an example, the flow 800 may include operation 808, where the computer system may cause execution of the first service to be initiated. In an example, the flow 800 may include operation 810, where the computer system may send, based at least in part on the execution of the first service and in a first response to the request, user information from the first user account. The first response can cause a presentation of the user information at the user interface. The first response may include item information indicating that the item is restricted. The first response may also include a presentation format controlling a presentation of at least a portion of the user information. The item information may also be presented in the user interface. The portion of the user information that is presented in the user interface can be based at least in part on the presentation format.

Figure 9:
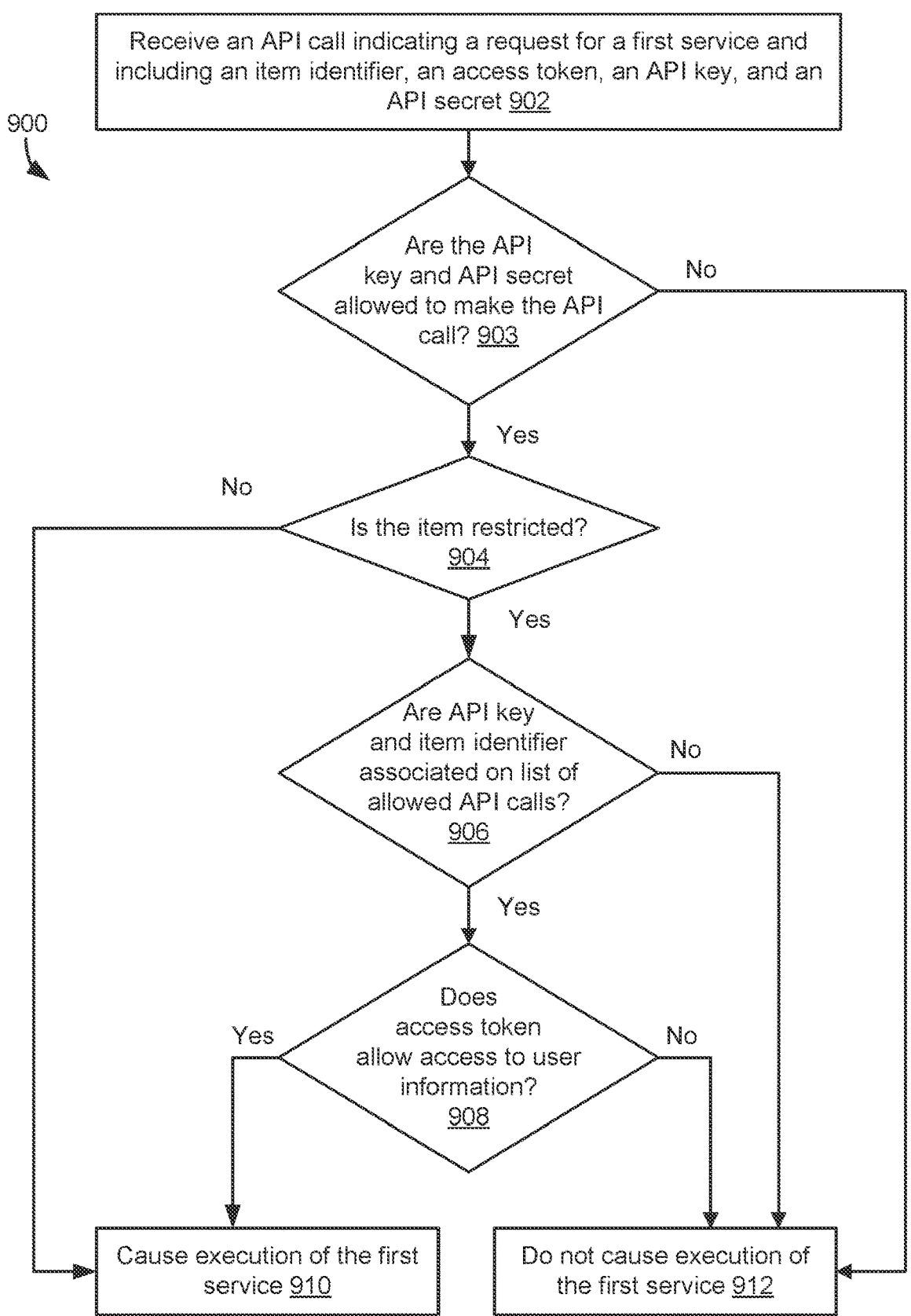
FIG. 9 illustrates an example flow for authenticating execution of a service of a first online resource via a second online resource, according to an embodiment of the present disclosure.

FIG. 9 illustrates an example flow 900 for authenticating execution of a service of a first online resource via a second online resource, according to an embodiment of the present disclosure. The flow 900 may start at operation 902, which includes a computer system receiving an API call indicating a request for a first service and including an item identifier, and an access token. In some examples, the API call may also include a secret. For example, the first service may be a purchase order for an item associated with the item identifier. In some examples, the access token may indicate that the second online resource has permission to access certain functions or information from the first online resource. The API secret may be an encrypted code established as a linkage between user accounts for the first online resource and the second online resource. The API secret may be a hash of data and/or data encrypted with a cryptographic key. The API key may be a key that the first online resource has assigned to the second online resource as identification. In other examples, the API call may not include an API secret.

In an example, the flow 900 may include operation 903, where the computer system may determine if the API key is allowed to make the API call. The computer system may determine that the API key is allowed to make the call by determining that the entity (e.g., the second online resource) identified by the API key is authorized to make the API call (e.g., by checking a list of approved entities). In some examples, the computer system may also determine that the hashed data from the API secret is a correct password for the API key. If the computer system determines that the API key and the API secret are allowed to make the API call, the flow 900 can continue to operation 904. In other examples without an API secret, the flow 900 can continue to operation 904 if the computer system determines that the API key is allowed to make the API call. If the computer system determines that the API key (and, optionally, that the API secret) are not allowed to make the API call, the flow 900 can continue to operation 912, where execution of the first service may not be initiated.

In an example, the flow 900 may include operation 904, where the computer system may determine if the item is restricted. The computer system may determine the item is restricted by accessing item information in a data structure using the item identifier associated with the item. The attribute may indicate if the item is restricted to resources other than the first online resource. For example, the item may be restricted to only be accessed via the second online resource. If the item is restricted, the flow 900 may continue to operation 906. If the item is not restricted, the flow 900 may continue to operation 910, where execution of the service can be initiated because the item is not restricted.

In an example, the flow 900 may include operation 906, where the computer system may determine if the API key and the item identifier are associated together on a list of allowed API calls. The list of allowed API calls may store API keys that are allowed to access certain item identifiers. If the API key is on the list of allowed API calls, and the list includes a match between the API key and the item identifier, the flow 900 may continue to operation 908. If the API key and the item identifier are not associated together on the list of allowed API calls, the flow may continue to operation 912, where execution of the first service is not initiated.

In some examples, the computer system may store an indication that the item is available from the first online resource to the user account based at least in part on the first request being authenticated. Then, the computer system can cause the user device to present a user interface element to request the item to become available from the first online resource to a second user account with the first online resource. That is, the user may interact with the user interface element to "gift" the exclusive access to another user with another user account.

In an example, the flow 900 may include operation 908, where the computer system may determine if the access token indicates that the second online resource has access to user information and item information from the first online resource. In particular, the access token may indicate a privilege level for accessing information associated with the user's profile (e.g., user information, item information) for the first online resource. If the access token indicates a privilege level authorizing access to the first service, the flow 900 may continue to operation 910. If the access token does not allow access to the user information, the flow may continue to operation 912.

In an example, the flow 900 may include operation 910, where the computer system may cause execution of the first service. This can involve executing a checkout process for an item, shipping an item, transmitting a virtual item to a user device, printing an item, or any other service associated with the item. In some examples, execution of the first service can include sending a response to the second online resource that causes information and/or a user interface element to be displayed on a graphical user interface of a user device. In an example, the flow 900 may include operation 912, where the computer system may not cause execution of the first service. In some examples, the computer system may also transmit a response indicating that the item is restricted.

Figure 10:
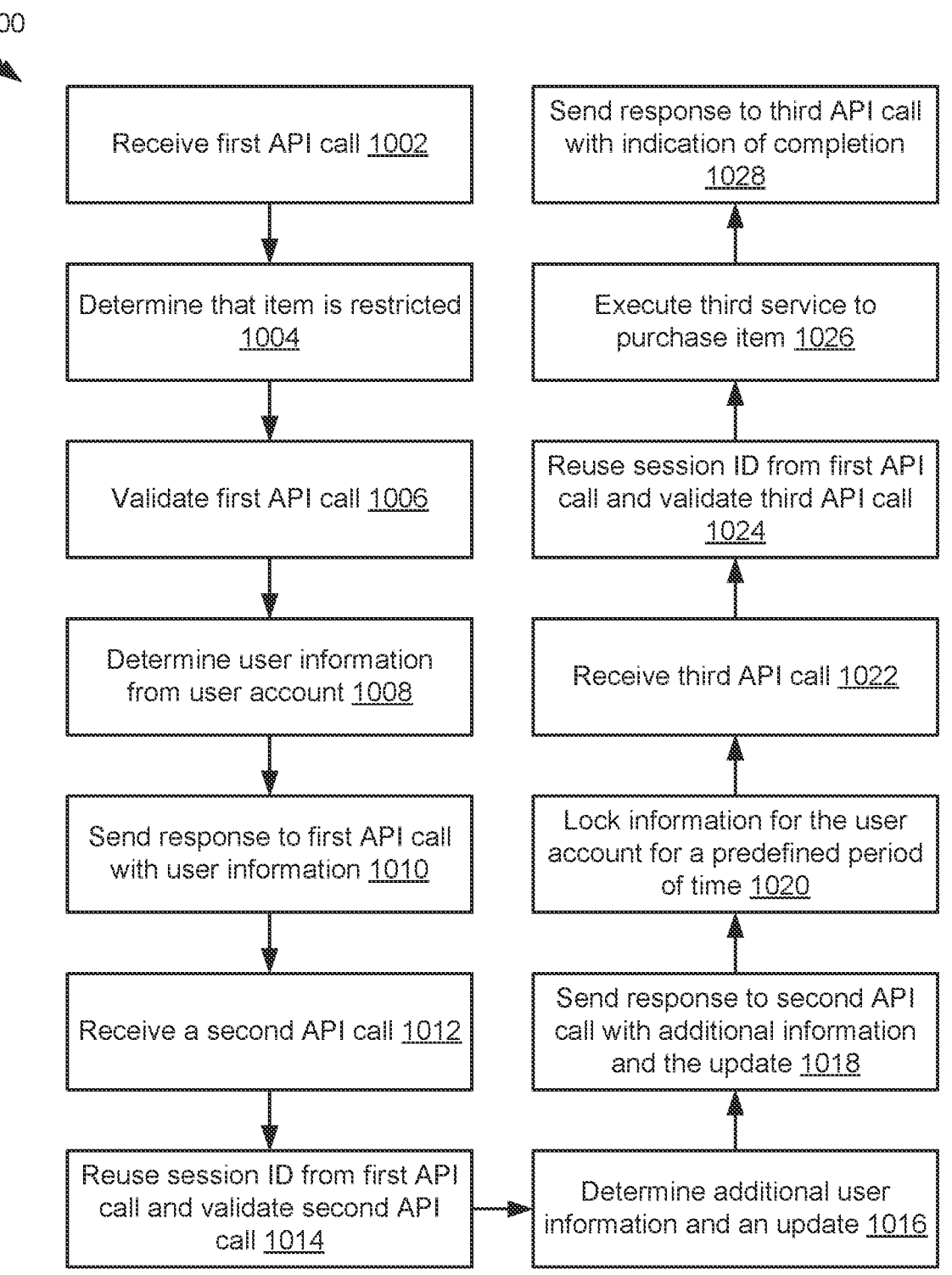
FIG. 10 illustrates an example flow for executing a service of a first online resource via a second online resource, according to an embodiment of the present disclosure.

FIG. 10 illustrates an example flow 1000 for executing a service of a first online resource via a second online resource, according to an embodiment of the present disclosure. The flow 1000 may start at operation 1002, which may include a computer system receiving a first API call of a second online resource. The first API call may indicate a request for a first service of a first online resource and may include an item identifier and authentication data. The item may be usable by the first service of the first online resource. For example, the item may be a shirt listed in an online catalog of an electronic store (e.g., the first online resource). The first service may be a request for item information for the shirt and user information for the user. The first API call may also include a session identifier for a current session of the user interacting with the second online resource.

In an example, the flow 1000 may include operation 1004, where the computer system may determine that the item is restricted. The first online resource may use the item identifier to identify an attribute associated with the item in a data structure (e.g., the online catalog). The item identifier may be a product number for the item. The attribute may be stored in association with the item identifier and may indicate that the item is restricted to one or more resources other than the first online resource, such as the second online resource. The item may be restricted according to the attribute until the second online resource indicates that the item is no longer restricted for the user. For example, the item may be restricted until the second online resource determines that the user has reached a certain level in a video game for the second online resource.

In an example, the flow 1000 may include operation 1006, where the computer system may validate the first API call. For example, the first online resource may access a list of allowed API calls to determine that an API key in the API call is matched with the item identifier in the list. The match can indicate that the second online resource is authorized to perform an API call for the item with the item identifier. Additionally, the first online resource may validate the first API call by authenticating the authentication data received as part of the first API call, such as by validating the API key and, in some examples, the API secret. In some examples, the first API call may also include a request for the item to no longer be restricted for the user's user account with the first online resource. Because the first API call is validated, the first online resource may store the indication that the item is no longer restricted with the attribute for the item in the user account.

In an example, the flow 1000 may include operation 1008, where the computer system may determine user information from the user account as part of executing the first service. The first service may be executed because the API call was validated and because the second online resource indicated that the first service is no longer restricted for the user. The user information determined by the computer system may include information associated with a checkout process for the user. For example, the user information may include a projected delivery date for the item based on a delivery address and a subscription status of the user.

In some examples, the computer system may also determine item information regarding variations of the item. For example, the computer system may determine first item information about a first variation of the item and second item information about a second variation of the item, such as a medium sized version of a shirt and a large sized version of a shirt. The computer system may also determine a default selection of one of the variations based on user information stored in the user account. For example, if the user account includes a purchase history of a shirt that was previously purchased in a medium size, the computer system may determine that a first variation of a medium size is to be selected as a default variation.

In an example, the flow 1000 may include operation 1010, where the computer system may send a response to the first API call with the user information. The response to the first API call may also include the item information, including variations of the item. For example, the response may cause a presentation of a user interface element to select the first variation or the second variation. In some examples, the response may include the first item information for the first variation, the second item information for the second variation, and an indication that the first variation is selected as the default variation to be displayed on a graphical user interface for the second online resource. The user may select the non-default variations if desired.

The response may also include item information indicating that the item is restricted, and a presentation format that controls a presentation of at least a portion of the user information. The item information can be presented in the graphical user interface and can also be presented based at least in part on the presentation format. The response may cause a presentation in the graphical user interface of a user interface element to request a second service of the first online resource.

In an example, the flow 1000 may include operation 1012, where the computer system may receive a second API call from the second online resource. The second API call may include a request for a second service of the first online resource, the item identifier, authentication data, and the session identifier for the current session of the user with the second online resource. The second API call can be received based at least in part on an interaction with the user interface element caused by the response to the first API call. The second service may be a second step of a checkout process that involves accessing information to be displayed in a "preview order" page for purchasing the item. In some examples, the second API call may also include a selection of the first variation of the item. The second service can therefore be executed in association with the first variation. That is, the preview order page information can be generated for a medium size shirt.

In an example, the flow 1000 may include operation 1014, where the computer system may reuse the session identifier from the first API call and may validate the second API call. The computer system may determine that the second request is associated with the same session identifier as the first request. The session identifier being the same as in the first request can indicate to the computer system that a response to the second request should use the same item information sent in the response to the first API call. In some examples, the computer system can determine, based at least in part on the same session identifier and the authentication data, that the second request is to be authenticated and that looking up the attribute is to be skipped. In other examples, the computer system may not skip re-authentication or looking up the attribute.

In an example, the flow 1000 may include operation 1016, where the computer system may determine additional user information and an update as part of execution of the second service. For example, the computer system can determine an update to at least a portion of the user information and additional user information. An example of the update can include updating a product price or a delivery timeline based on the user information. The update to at least a portion of the user information can include any information change since the first API response. The additional user information may include additional information that is to be included in the "preview order" page, such as tax information for the item based on the location of the user.

In an example, the flow 1000 may include operation 1018, where the computer system may send a response to the second API call with the additional user information and the update. The response may include the additional user information and the update to the user information that is to be included in a "preview order" page presented by the graphical user interface for the second online resource. The response to the second API call may cause a presentation of the additional user information and the update at the graphical user interface. In some examples, this can include a user interface element that a user can interact with to initiate execution of a third service for the first online resource. For example, the user interface element may be a button labeled "confirm purchase."

In an example, the flow 1000 may include operation 1020, where the computer system may lock information for the user account for a predefined period of time. For example, based at least in part on the execution of the second service, the computer system may determine item information associated with the item. The item information may include a price of the item, an estimated delivery date for the item, or the like. The computer system may associate the item information with the first user account such that the item information remains available for use by the first user service for the first user account for a predefined period of time. For example, the user may be able to initiate a third service (e.g., purchasing the item according to the item information displayed on the "preview order" page of the graphical user interface of the second online resource) for up to twelve hours. After the predefined period of time expires, the user may have to reinitiate the first service and the second service to complete purchase of the item, as the item information for the current purchase may no longer be associated with the first user account.

In an example, the flow 1000 may include operation 1022, where the computer system may receive a third API call from the second online resource. The third API call may include a request for a third service of the first online resource, the item identifier, authentication data, and the session identifier for the current session of the user with the second online resource. The third API call can be received based at least in part on an interaction with the user interface element caused by the response to the second API call. The third service may be a third step of a checkout process that involves initiating a purchase order for the item. For example, the third service may be executed to purchase the shirt in a medium size and to ship the shirt to the shipping address for the user.

In an example, the flow 1000 may include operation 1024, where the computer system may reuse the session ID from the first API call and may validate the third API call. The computer system may determine that the third request is associated with the same session identifier as the first request. In some examples, the computer system can determine, based at least in part on the same session identifier and the authentication data, that the third request is to be authenticated and that looking up the attribute is to be skipped. In other examples, the computer system may not skip re-authentication or looking up the attribute.

In an example, the flow 1000 may include operation 1026, where the computer system may execute the third service to purchase the item. Execution of the third service may be similar to execution of purchase processes for the first online resource that are not restricted. For example, the computer system may bill the cost of the item to the payment information stored for the user in the first user account. The computer system may initiate a shipping process for delivering the item to the shipping address stored for the user in the first user account. Executing the third service may also include generating information confirming the purchase to send to the second online resource. The computer system may then determine a completion of execution of the third service.

In an example, the flow 1000 may include operation 1028, where the computer system may send a response to the third API call that includes an indication of the completion. The response may include the purchase information that is to be presented by the graphical user interface for the second online resource, and an indication of the completion of the checkout process. The response to the third API call may cause a presentation of the purchase information and the indication at the graphical user interface. In some examples, the indication of completion can cause an update to a service of the second online resource to be presented at the user device. For example, purchasing the item may unlock a virtual version of the item that can be applied to an avatar of the user in the second online resource. The user's avatar in the graphical user interface for the second online resource may be automatically updated to be wearing the shirt purchased by the user.

Figure 11:
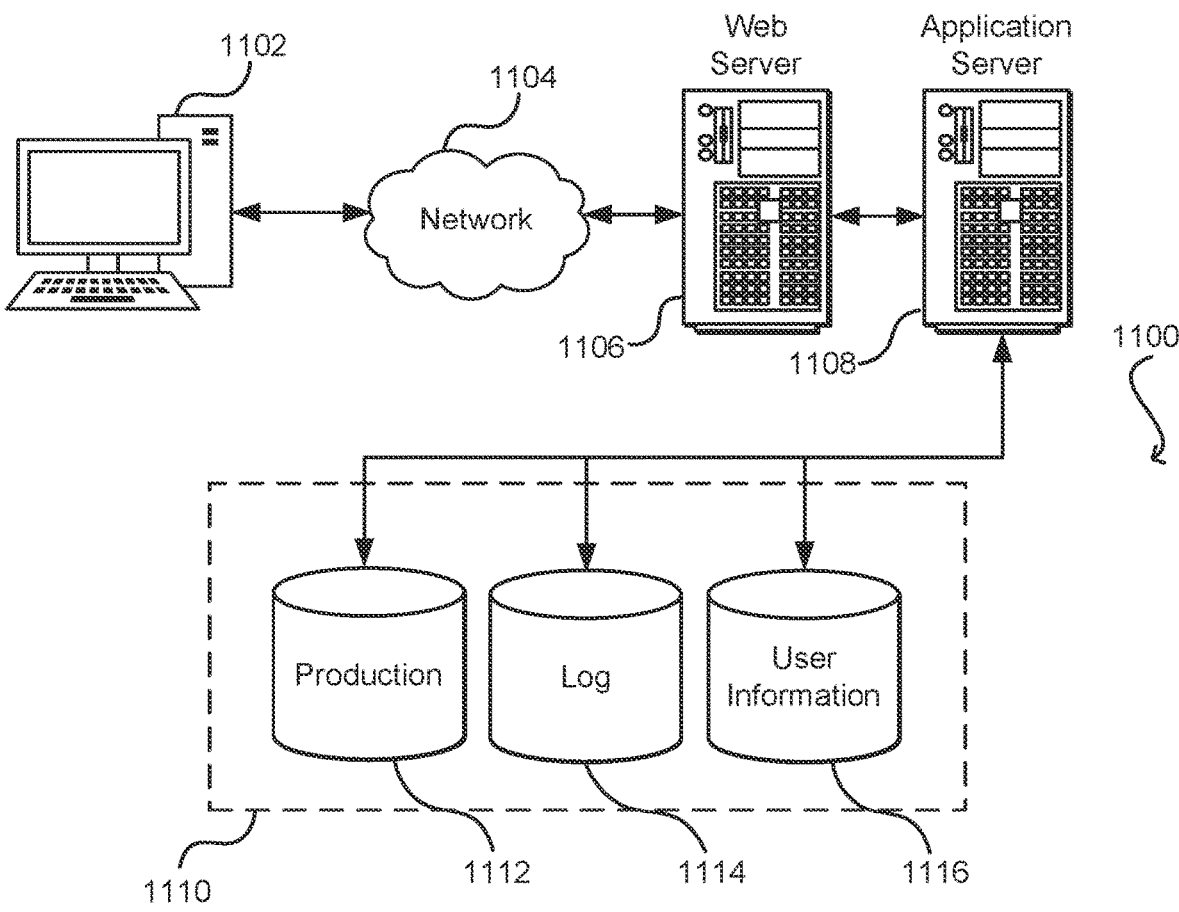
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes a user device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system comprising:
    one or more processors; and one or more memory storing instructions that, upon execution by the one or more processors, configure the computer system:
        store, in a data structure, item information and an attribute, the item information describing an item having an item identifier and usable by a first service of a first online resource, the attribute indicating that the item is restricted to one or more resources other than the first online resource;
        receive, from a user device based at least in part on a graphical user interface (GUI) presented by the user device to a second online resource, a first application programming interface (API) call of the second online resource, the first API call indicating a request for the first service and including the item identifier and authentication data;
        determine the attribute from the data structure based at least in part on the item identifier from the first API call;
        determine, based at least in part on the attribute, that the item is available via the second online resource upon an authentication of the request;
        determine, based at least in part on the authentication data, that the request is authenticated and a first user account with the first online resource, the first user account being inaccessible to the second online resource;
        cause execution of the first service to be initiated;
        determine, based at least in part on the execution, user information from the first user account and the item information from the data structure; and
        send, in a first response to the first API call, the user information and the item information, the first response causing the user device to present the user information and the item information in the GUI.

2. The computer system of claim 1, wherein the authentication data comprises an access token and an API key, wherein the request is determined to be authenticated by at least determining that the access token indicates that a second user account with the second online resource has a privilege level to access the user information and the item information from the data structure and by validating that the API key is associated with the second online resource.

3. The computer system of claim 1, wherein the one or more memory store further instructions that, upon execution by the one or more processors, further configure the computer system:
    determine a list of allowed API calls associated with the first service, the list of allowed API calls storing an association between an API key and the item identifier; and
    determine that the list includes the association, wherein the execution of the first service is initiated based at least in part on the list including the association.

4. A method implemented by a computer system, the method comprising:
    receiving, based at least in part on a user interface at a user device to a second online resource, an item identifier associated with an item, authentication data, and a first request for a first service of a first online resource;
    determining, based at least in part on the item identifier, an attribute of the item, the attribute indicating that the item is available via the second online resource and unavailable via the first online resource;
    determining, based at least in part on the authentication data, that the first request is authenticated and a first user account with the first online resource, the first user account being inaccessible to the second online resource;

causing execution of the first service to be initiated; and sending, based at least in part on the execution of the first service and in a first response to the first request, user information from the first user account, the first response causing a presentation of the user information at the user interface.

5. The method of claim 4, further comprising:

storing, in a data structure, item information and the attribute, the item information describing the item and usable by the first service, the attribute indicating that the item is restricted to one or more resources other than the first online resource, wherein the attribute is determined from the data structure, and wherein the item information is included in the first response.

6. The method of claim 4, further comprising:

including, in the first response, item information indicating that the item is restricted and a presentation format controlling a presentation of at least a portion of the user information, wherein the item information is presented in the user interface, and wherein the portion is presented in the user interface based at least in part on the presentation format.

7. The method of claim 4, further comprising:

causing, based at least in part on the first response, a presentation in the user interface of a user interface element to request a second service of the first online resource;

receiving, based at least in part on an interaction with the user interface element, the item identifier, the authentication data, and a second request for the second service;

determining, based at least in part on the authentication data, that the second request is authenticated; and causing execution of the second service to be initiated.

8. The method of claim 7, further comprising:

determining, based at least in part on the execution of the second service, an update to at least a portion of the user information and additional user information; and sending a second response to the second request, the second response causing a presentation of the update and the additional user information at the user interface.

9. The method of claim 7, further comprising:

determining, based at least in part on the execution of the second service, item information associated with the item;

associating the item information with the first user account such that the item information remains available for use by the first service for the first user account for a predefined period of time; and sending, a second response to the second request, the second response causing a presentation of the item information at the user interface.

10. The method of claim 7, further comprising:

determining that the second request is associated with a same session identifier as the first request; and determining, based at least in part on the session identifier, that a second response to the second request is to include same item information that was included in the first response.

11. The method of claim 4, further comprising:

receiving, from the user device, a second request for a second service of the first online resource;

causing execution of the second service to be initiated;

determining a completion of the execution of the second service; and sending, to the user device, an indication of the completion, the indication causing an update to a third service of the second online resource to be presented at the user device.

12. The method of claim 4, further comprising:

receiving, prior to receiving the first request and based at least in part on the user interface at the user device to the first online resource, a second request for item information associated with the item;

determining, based at least in part on the attribute of the item, that the item is unavailable via the first online resource; and causing, the user device to present in the user interface to the first service, a first indication that the item is unavailable via the first online resource and a second indication that the item is available from the second online resource, wherein the second indication is linked to the second online resource.

13. The method of claim 4, further comprising:

receiving, from the second online resource, an indication that attribute is no longer applicable to the first user account;

associating the indication with the first user account;

receiving, based at least in part on the user interface at the user device to the first online resource, a second request for item information associated with the item;

determining, based at least in part on the indication being associated with the first user account, that the item is available via the first online resource; and causing, the user device to present in the user interface to the first service, the item information and a user interface element to execute the first service.

14. One or more computer-readable storage media storing instructions that, upon execution on a computer system, cause the computer system to perform operations comprising:

receiving, based at least in part on a user interface at a user device to a second online resource, an item identifier associated with an item, authentication data, and a first request for a first service of a first online resource;

determining, based at least in part on the item identifier, an attribute of the item, the attribute indicating that the item is available via the second online resource and unavailable via the first online resource;

determining, based at least in part on the authentication data, that the first request is authenticated and a first user account with the first online resource, the first user account being inaccessible to the second online resource;

causing execution of the first service to be initiated; and sending, based at least in part on the execution of the first service and in a first response to the first request, user information from the first user account, the first response causing a presentation of the user information at the user interface.

15. The one or more computer-readable storage media of claim 14, wherein the operations further comprise:

including, in the first response, first item information about a first variation of the item and second item information about a second variation of the item;

causing, in the user interface, a presentation of a user interface element to select the first variation or the second variation;

receiving, based at least in part on an interaction of the user interface element, a selection of the first variation; and executing, in association with the first variation, a second service of the first online resource.

16. The one or more computer-readable storage media of claim 14, wherein the operations further comprise:

determining item information about a variation of the item;

determining, based at least in part on the first user account, that the item information is to be presented; and including, in the first response, the item information.

17. The one or more computer-readable storage media of claim 14, wherein the operations further comprise;

storing, prior to receiving the first request, an association between the first user account and a second user account with the second online resource, wherein the authentication data is based at least in part on the association; and storing, prior to receiving the first request, a permission associated with the first user account to present a user interface element to request the first service via the second online resource, wherein the first request is received based at least in part on an interaction with the user interface element in the user interface.

18. The one or more computer-readable storage media of claim 14, wherein the operations further comprise:

storing, based at least in part on the first request being authenticated, an indication that the item is available from the first online resource to the first user account; and causing the user device to present a user interface element to request the item to become available from the first online resource to a second user account with the first online resource.

19. The one or more computer-readable storage media of claim 14, wherein the operations further comprise:

receiving, based at least in part on input via the user interface, a change to at least a portion of the user information; and storing the change in association with the first user account and the item identifier.

20. The one or more computer-readable storage media of claim 14, wherein the operations further comprise:

causing, at the user interface to the second online resource, to present a user interface element associated with changing at least a portion of the user information;

receiving, from the user device, an indication of an interaction with the user interface element;

causing, based at least in part on the indication, the user device to present the user interface to the first service;

receiving, based at least in part on input via the user interface to the first service, a change to at least the portion of the user information; and storing the change in association with the first user account and the item identifier.

* * * * *